(12) United States Patent
Naik et al.

(10) Patent No.: US 9,553,974 B2
(45) Date of Patent: Jan. 24, 2017

(54) MEDIA/VOICE BINDING PROTOCOL AND RELATED USER INTERFACES

(75) Inventors: Devang K. Naik, San Jose, CA (US); Kevin Tiene, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1357 days.

(21) Appl. No.: 12/854,863

(22) Filed: Aug. 11, 2010

(65) Prior Publication Data
US 2012/0040644 A1 Feb. 16, 2012

(51) Int. Cl.
*H04L 12/58* (2006.01)
*H04M 1/725* (2006.01)
(Continued)

(52) U.S. Cl.
CPC ...... *H04M 1/72555* (2013.01); *H04L 65/4023* (2013.01); *H04L 65/4053* (2013.01); *H04M 1/72522* (2013.01); *H04N 1/00307* (2013.01); *H04M 1/274508* (2013.01); *H04M 1/7255* (2013.01); *H04M 1/72552* (2013.01); *H04M 3/567* (2013.01); *H04M 2203/654* (2013.01); *H04M 2250/64* (2013.01); *H04N 1/00442* (2013.01); *H04N 7/147* (2013.01); *H04N 2201/0087* (2013.01)

(58) Field of Classification Search
CPC ...... H04W 64/00; H04W 88/06; H04W 4/025; H04W 4/22; H04W 4/023; H04W 88/02; H04M 11/04; H04M 2207/20; H04M 2242/04; H04M 2242/30; H04M 1/6041; H04M 1/67; H04M 1/72533; H04M 7/006; H04L 1/0003
USPC .. 455/412.1, 413, 414.1, 416, 417; 370/338, 352, 401; 348/14.01, 14.02
See application file for complete search history.

(56) References Cited

U.S. PATENT DOCUMENTS 5,978,835 A 11/1999 Ludwig et al.
6,917,613 B1 7/2005 Tiburtius et al.
(Continued)

FOREIGN PATENT DOCUMENTS

CN 101443727 A 5/2009
DE 102006001503 7/2007
(Continued)

OTHER PUBLICATIONS

Authorized Officer Reichert, Jacques, International Search Report and the Written Opinion for Application No. PCT/US2001/047101, dated Oct. 26, 2011, 15 pages.

*Primary Examiner* — Nimesh Patel
(74) *Attorney, Agent, or Firm* — Blank Rome LLP

(57) ABSTRACT

One or more media items can be bound to a voice call using a binding protocol. The binding protocol allows call participants to more easily transfer media items to other call participants using one or more user interfaces. A call participant can initiate a media transfer by selecting the media and a communication modality for transferring the media. The binding protocol can be active or lazy. In lazy binding, the call participant can select the desired media for transfer before the voice call is established, and subsequently mark the media for binding with the voice call. In active binding, the call participant can select and transfer the desired media item during the voice call, and the media item is automatically bound to the voice call. The media item can be transferred using a user-selected communication modality over an independent data communication channel.

21 Claims, 13 Drawing Sheets

(51) Int. Cl.
*H04N 1/00* (2006.01)
*H04L 29/06* (2006.01)
H04M 1/2745 (2006.01)
H04M 3/56 (2006.01)
H04N 7/14 (2006.01)

(56) References Cited

U.S. PATENT DOCUMENTS

| | | |
|---|---|---|
| 7,092,370 B2 | 8/2006 | Jiang et al. |
| 7,167,710 B2 | 1/2007 | Thakkar et al. |
| 7,196,718 B1 | 3/2007 | Barbeau et al. |
| 2003/0108014 A1 | 6/2003 | Newberg et al. |
| 2004/0125933 A1 | 7/2004 | Jun et al. |
| 2006/0079201 A1 | 4/2006 | Chung et al. |
| 2006/0168150 A1* | 7/2006 | Naik et al. .................... 709/219 |
| 2006/0193448 A1 | 8/2006 | Donoghue et al. |
| 2007/0160085 A1* | 7/2007 | Schmidt et al. .............. 370/493 |
| 2008/0126350 A1 | 5/2008 | Shoemaker et al. |
| 2009/0054092 A1 | 2/2009 | Stonefield et al. |
| 2009/0143007 A1 | 6/2009 | Terlizzi |
| 2009/0209240 A1 | 8/2009 | Mahowald et al. |

FOREIGN PATENT DOCUMENTS

| | | |
|---|---|---|
| JP | 2000013866 A | 1/2000 |
| JP | 2002218095 | 8/2002 |
| JP | 20031255451 A | 4/2003 |

* cited by examiner

MEDIA/VOICE BINDING PROTOCOL AND RELATED USER INTERFACES

TECHNICAL FIELD

This disclosure relates generally to multifunction communication devices, such as mobile smart phones with telephony, e-mail and text messaging capability.

BACKGROUND

Modern mobile devices may include a variety of communication applications, such as telephony, text messaging and e-mail. These applications often include a contacts database or "address book" containing telephone numbers (e.g., work, mobile, facsimile) and e-mail addresses of contacts known to the user of the device. The user can access the contacts database on the mobile device to simplify and quicken communication with the known contacts (e.g., friends, family, coworkers, clients).

Some mobile devices include Multimedia Messaging Service (MMS) that allows a first user to send media (e.g., photos, video) to second user while participating with the second user in a text chat. However, if the first user is participating in a voice call with the second user, the first user may need to access a contact record for the second user to get media communication information (e.g., email address, mobile phone number) and configure another communication modality (e.g., email, text messaging) to send the media to the second user during the voice call.

SUMMARY

One or more media items can be bound to a voice call using a binding protocol. The binding protocol allows call participants to more easily transfer media items to other call participants using one or more user interfaces. A call participant can initiate a media transfer by selecting the media and a communication modality for transferring the media. The binding protocol can be active or lazy. In lazy binding, the call participant can select the desired media for transfer before the voice call is established, and subsequently mark the media for binding with the voice call. In active binding, the call participant can select and transfer the desired media item during the voice call, and the media item is automatically bound to the voice call. The media item can be transferred using a user-selected communication modality over an independent data communication channel. A transfer log can be maintained for media items bound to voice calls.

In some implementations, a computer-implemented method can be performed by one or more hardware processors of a mobile device. The method includes: detecting an ongoing voice call; automatically binding media to the voice call; receiving a request to transfer media; and transferring the media to a call participant based on the binding.

In some implementations, a computer-implemented method can be performed by one or more hardware processors of a mobile device. The method includes: receiving input binding media with a voice call to be made; detecting that the voice call is made; and transferring the media to a call participant based on the binding.

In some implementations, a computer-implemented method can be performed by one or more hardware processors of a mobile device. The method includes: detecting an ongoing voice call; receiving media and an indicator that media is bound to the voice call; and storing the media and indicator.

Other features include various user interfaces for implementing active and lazy binding protocols, and for generating and persistently storing binding data on the communication device or on a network storage device to allow the transfer of media items during or after the voice call. The media or a reference to the media can also be stored for downloading the media to call participants. A log of transfers of media bound to voice calls can also be maintained.

These features allow call participants to bind media to a voice call during the voice call and transfer the media to other call participants without having to look up the contact information for each call participant, and without manually configuring applications to transfer the media to the call participants. These features also allow users to interact using multiple modalities offering an experience of more unified communication. Furthermore, these features allow disparate modalities such as email, MMS and digital images to be tied to a common task in the context of a call.

The details of one or more implementations of media/voice binding protocol and related user interfaces are set forth in the accompanying drawings and the description below. Other features, aspects, and advantages will become apparent from the description, the drawings, and the claims.

BRIEF DESCRIPTION OF THE DRAWINGS

Like reference symbols in the various drawings indicate like elements.

DETAILED DESCRIPTION

Overview of Media/Voice Binding Protocol

Figure 1:
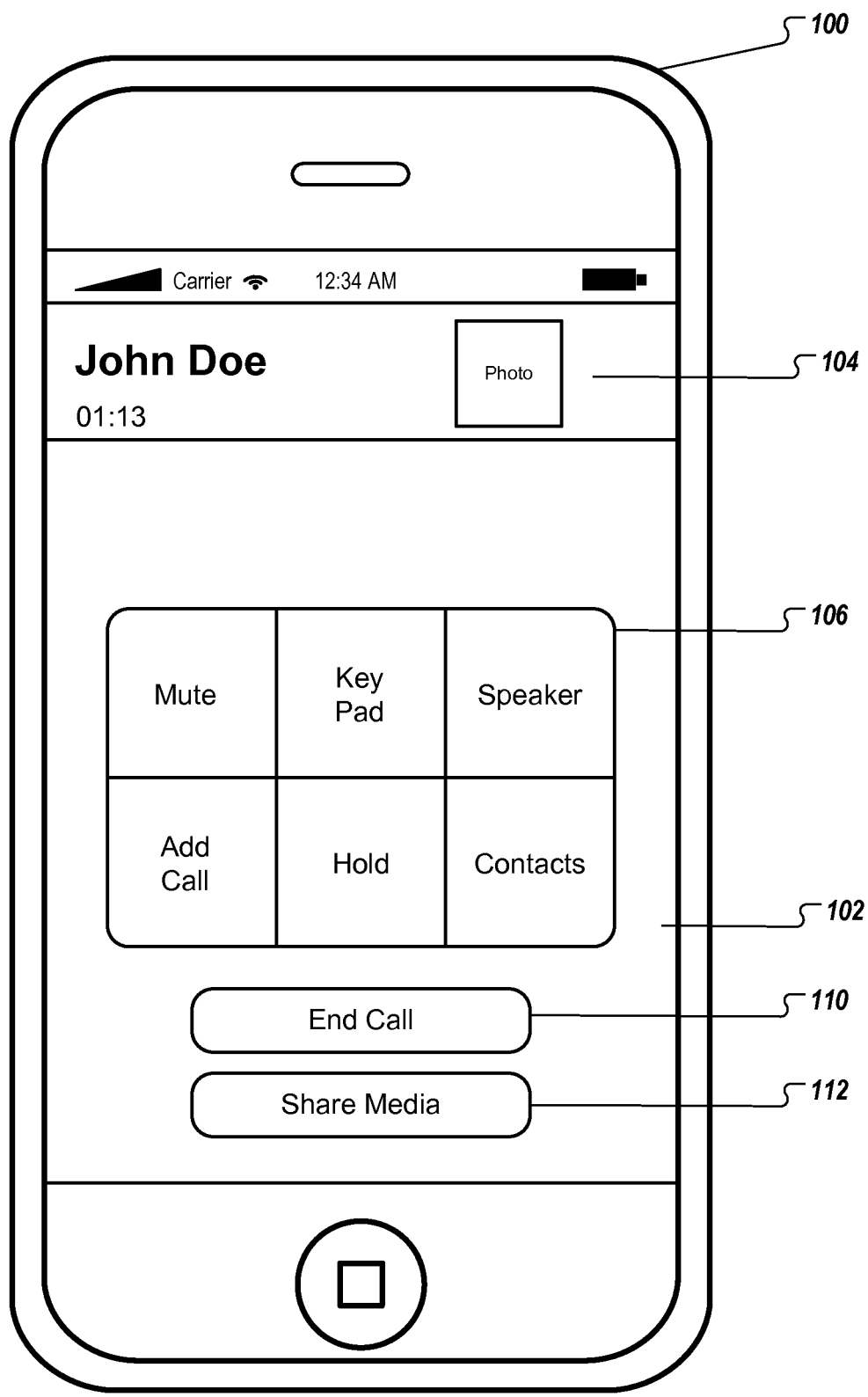
FIG. 1 illustrates an exemplary user interface of a telephony application displayed during a voice call.

FIG. 1 illustrates an exemplary user interface of a telephony application displayed during a voice call. In some implementations, communication device 100 includes display surface 102 for presenting call control interface 106.

Communication device 100 can be a mobile device, e-mail device, game console, television screen, personal computer, electronic tablet, media player or any other device with communication capability. The display surface 102 can be a touch sensitive surface capable of responding to multi-touch input with one or more fingers or a stylus. A call information region 104 can display the name and photo of the called party (e.g., "John Doe") and the elapsed time.

In this example, a user of communication device 100 placed a call to John Doe and the call has been ongoing for 1 minute and 13 seconds. The user desires to bind media to the call. This type of binding are referred to as "active binding." In active binding, the call participant can select and transfer the desired media item during the voice call, and the media item is automatically bound to the voice call.

Media can include any information or content in any known digital format, including but not limited to: photos, videos, audio files, documents, contacts, calendars, emails, video voicemail, web pages, ringtones, links, multimedia messages or presentations, call logs or records, forms or any other information or content that can be transmitted between two or more devices. In some implementations, the media can be a HTML or XML file or any other code, script (e.g., Java Script) or instructions for generating a user interface for presenting information to the called party or receiving input from the called party during the voice call. For example, a banking institution can send a file that causes a Personal Identification Number (PIN) pad to display on a customer's device during a call with a customer service representative of the bank. The customer can enter his or her PIN to authenticate the customer over a secure data communication channel independent of the voice call channel.

To bind media to the call, in some implementations, the user can invoke call control interface 106. Call control interface 106 can include several functions for controlling the ongoing voice call. In the example shown, the call control functions are Mute, Key Pad, Speaker, Add Call, Hold and Contacts. Other call control functions are also possible. Selecting Contacts 114 allows access to contact records, such as the contact record shown in reference to FIG. 4. Selecting the "end call" button 110 ends the voice call. Selecting the "share media" button 112 invokes user interfaces for a binding protocol that allows media to be bound to the voice call.

Figure 2:
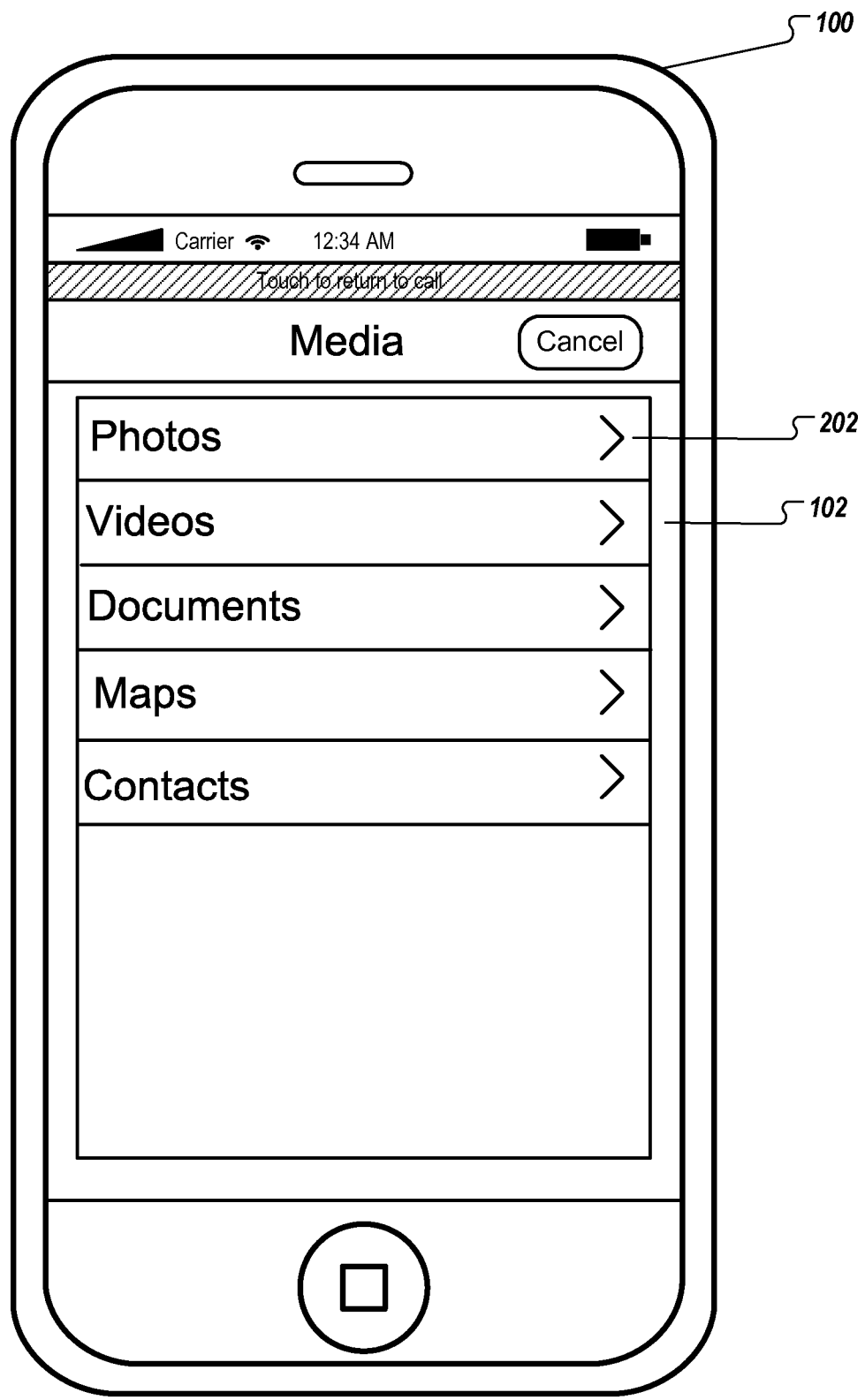
FIG. 2 illustrates an exemplary user interface for selecting a media type.

FIG. 2 illustrates an exemplary user interface for selecting a media type. In some implementations, when the user selects share media button 112 during a voice call, a list of media types are displayed on surface 102. The list of media types allows the user to select a particular media type. Some examples of media types include but are not limited to: photos, videos, documents, maps and contacts. Selecting a media type from the media type list can result in one or more additional user interfaces (also referred to as "pickers") being displayed for selecting specific media items for binding with the voice call. In some implementations, the user can touch the "Touch to return to call" portion of the display surface 102 to return to the call interface.

Figure 3A:
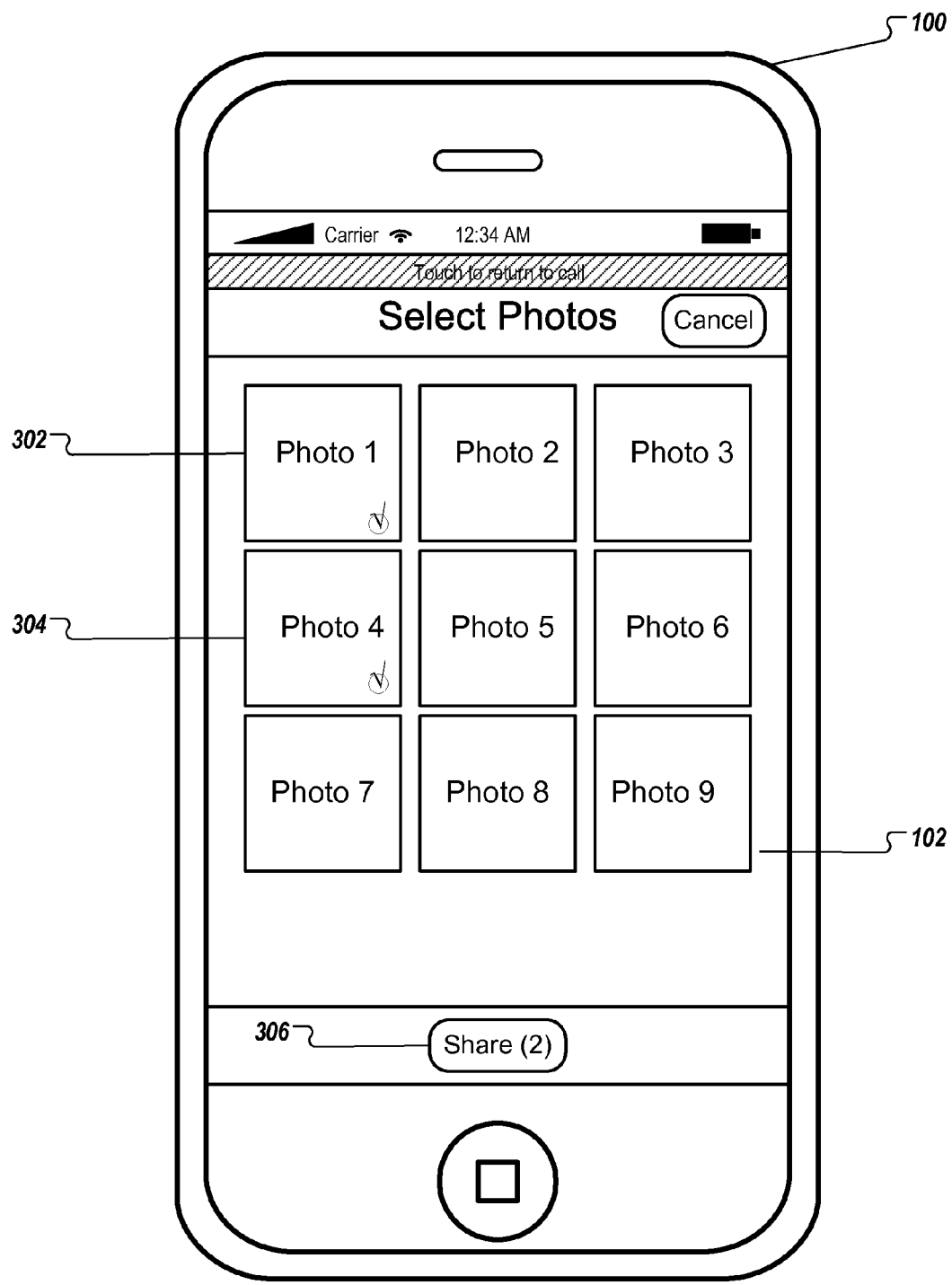
FIG. 3A illustrates an exemplary user interface for selecting media of the media type.

FIG. 3A illustrates an exemplary user interface for selecting media of the media type. In this example, the user selected the Photo media type 202 which resulted in a photo picker being displayed on surface 102. The user selects Photo 302 ("Photo 1") and Photo 304 ("Photo 4") for binding to the voice call. Visual cues or badges can be displayed on the selected photos to indicate their selection. When the user finishes selecting photos 302, 304, the user can select "share" button 306 to complete the binding process.

Upon selection of share button 306, a processor of communication device (see, e.g., FIG. 5) automatically tags the media with a unique binding identifier (e.g., a unique number) representing the voice call and persistently stores the unique binding identifier in a database on the communication device and/or on a storage device of a network resource. Additional information related to the call can also be stored, including but not limited to: the telephone number of the called party, the date and time of the call, the names of the call participants (if available), the duration of the call and other contact information for the call participants (e.g., other telephone numbers, email address). In some implementations, if a contact record or other contact information source is available for a call participant, the process can mine the contact record or other information source for this additional information. The unique binding identifier and additional information are collectively referred to as "binding data."

Figure 3B:
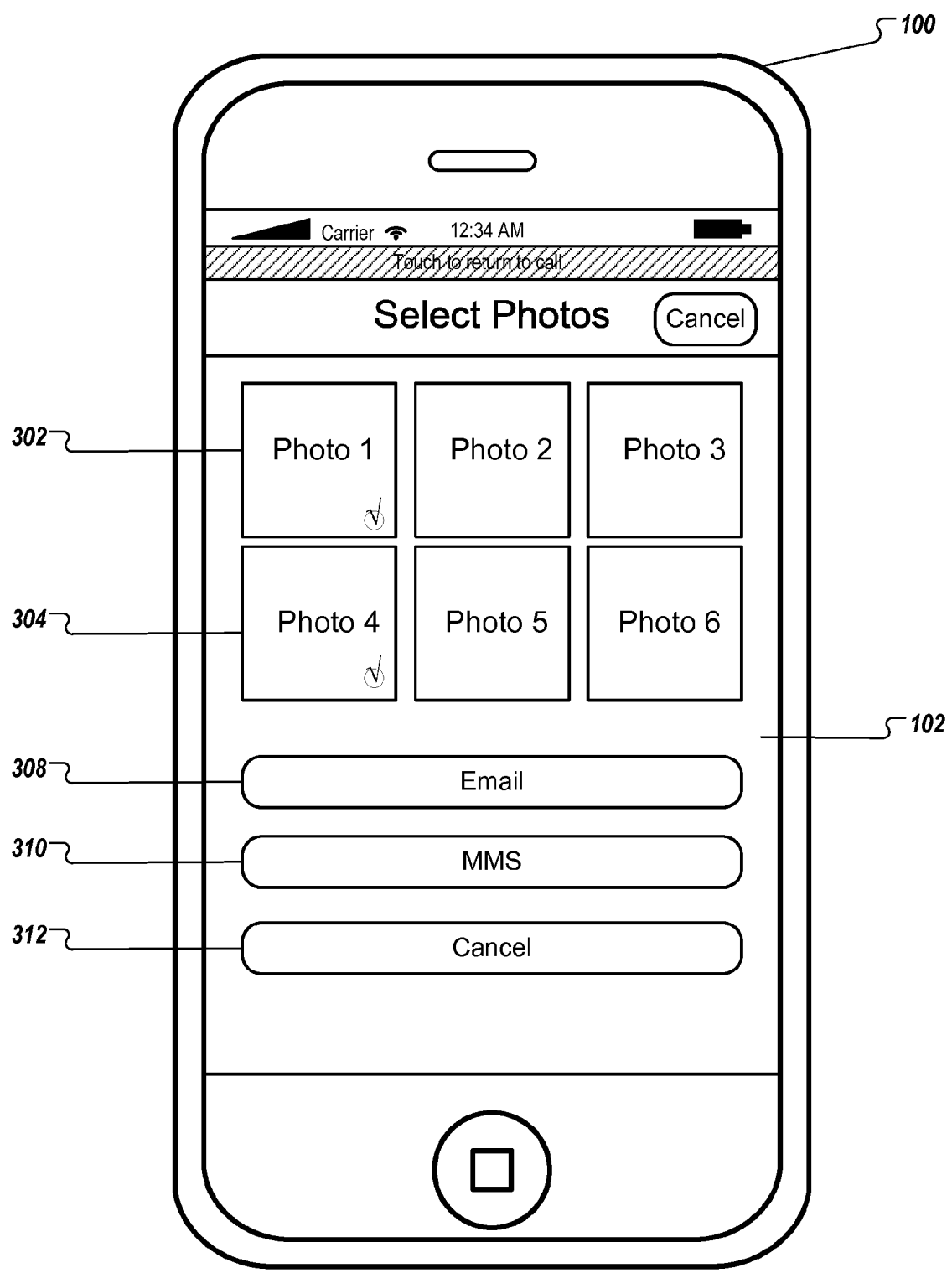
FIG. 3B illustrates an exemplary user interface for selecting a communication modality.

FIG. 3B illustrates an exemplary user interface for selecting a communication modality. Upon user selection of share button 306, other buttons for selecting a communication modality can be displayed on surface 102. In this example, an "email" button 308 and an "MMS" button 312 are displayed. A "cancel" button 312 can be displayed for navigating back to the prior user interface. The user selects MMS button 312 to select MMS as the communication modality for transferring photos 302, 304 to John Doe. Because the binding data is persistently stored, the media items can be transferred to John Doe during or after the voice call. This binding protocol allows the user to select and transfer media to a call participant without having to navigate multiple pages, menus or user interfaces. The binding protocol also allows selected communications modalities to be automatically configured as described in reference to FIG. 3C.

Figure 3C:
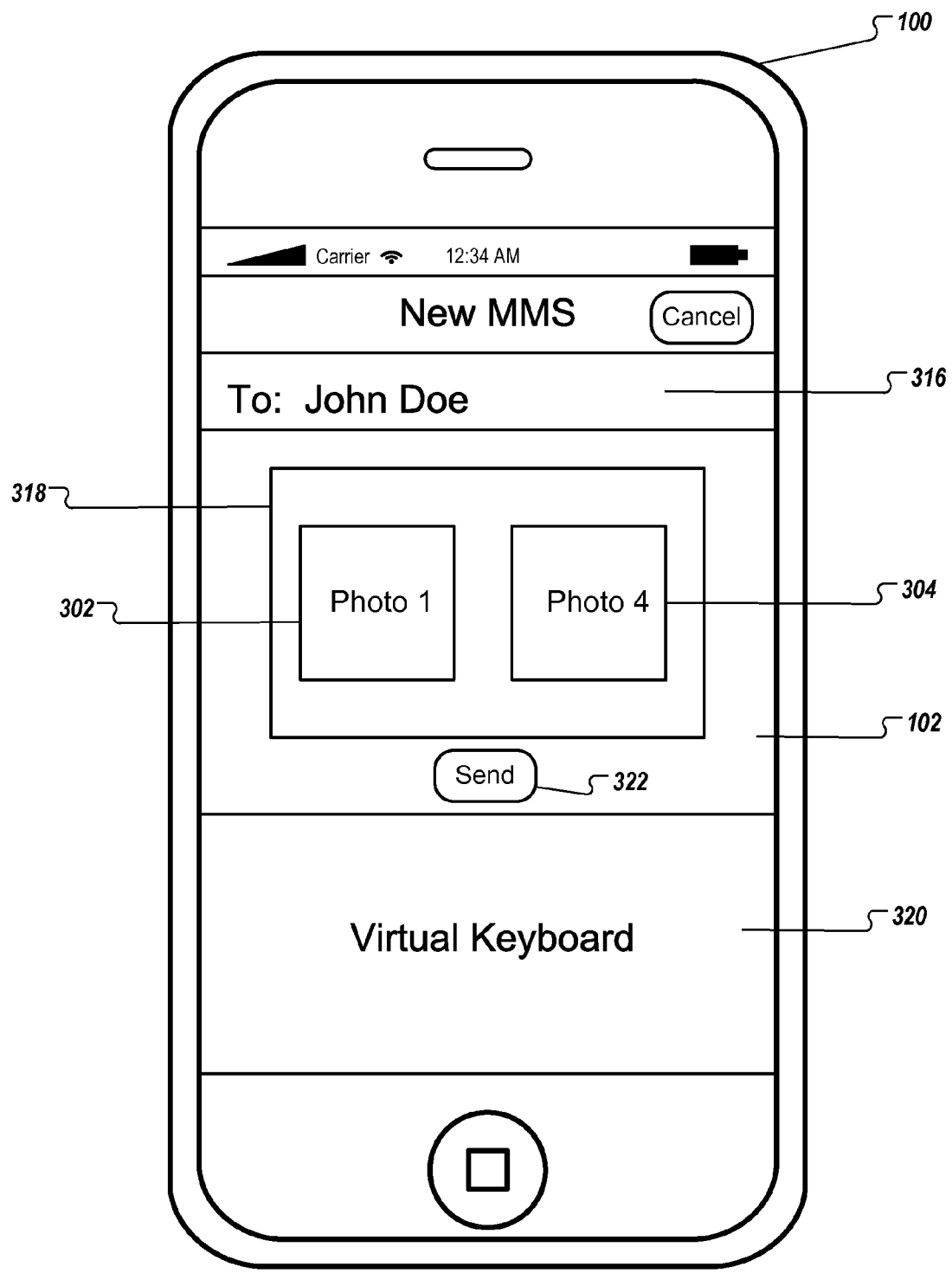
FIG. 3C illustrates an exemplary user interface for a communication modality.

FIG. 3C illustrates an exemplary user interface for a communication modality. In some implementations, if contact information is available for a call participant, then such information can be used to configure the selected communication modality. For example, if the user selected Email button 308 in the user interface of FIG. 3B, then the email address of John Doe is automatically inserted in the address field of an email message (e.g., inserted in the To: field), and photos 302, 304 are automatically added as attachments to the email.

In the example of FIG. 3C, the user selected MMS button 310. A user interface for text messaging with MMS is displayed on surface 102. The user interface includes an address field 316, a content window 318 and a virtual keyboard 320. In this example, photos 302 and 304 are shown in content window 318 and will be transferred to John Doe as part of a text message. A "send" button 322 can be used to initiate the transfer of the text message and photos to John Doe. An audio indicator can be provided to indicate when the transfer has successfully completed.

In this example, photos were the media items transferred. However, any media items can be transferred in a similar manner depending on the communication modality and associated communication protocols. Also, the binding protocol can work with a number of call recipients. Both participants (calling party and called party) can invoke the binding protocol. If the voice call was a conference call, three or more call participants can invoke the binding protocol. A media item transferred between call participants can be stored on a network storage device operated by a network resource, as described in reference to FIG. 6.

Figure 4:
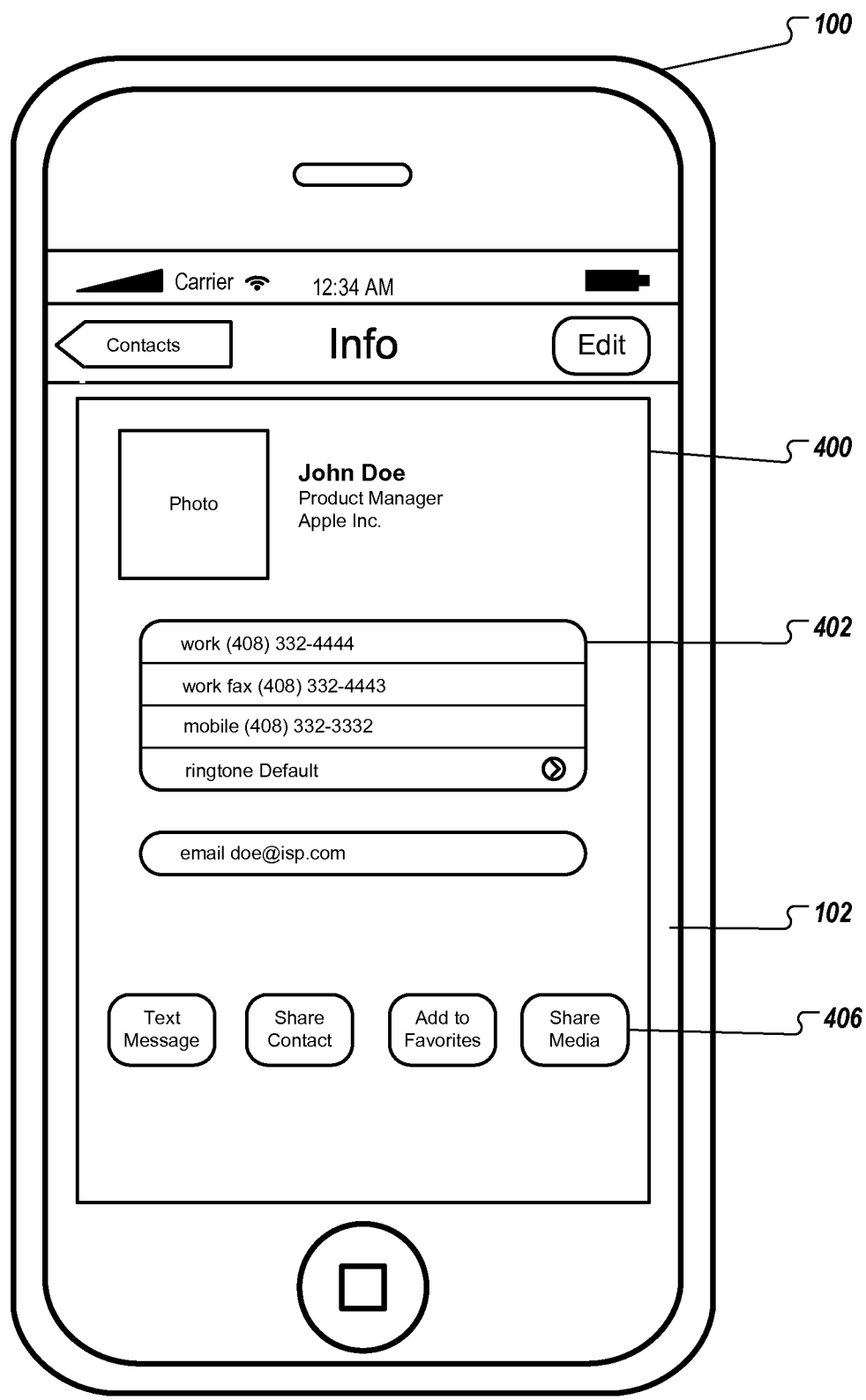
FIG. 4 illustrates an exemplary contact page for binding media to a voice call.

FIG. 4 illustrates an exemplary contact page for binding media to a voice call. In some implementations, a "lazy binding" can be applied. In lazy binding, the call participant can select the desired media for transfer before the voice call is established, and subsequently mark the media for binding with the voice call.

In some implementations, a contact page 400 can include contact information 402 and a number of buttons for managing information for the contact. Contact information 402 can include various telephone numbers (e.g., work, work fax, mobile) and an email address. Other information can include a photo and a ringtone selection menu. The buttons can include "text message," "share contact," "add to favorites" and "share media." The text message button, when selected, can invoke a text messaging application and pre-address a text message with John Doe's mobile number. Share Contact button allows John Doe's contact information to be shared with others. Add to Favorites button allows John Doe's contact information to be added to a Favorites list.

"Share Media" button 406 navigates the user to the user interface of FIG. 2, where the user can perform the same binding protocol steps as described for active binding. In lazy binding, however, when the user selects a communication modality from the user interface of FIG. 3B, a binding identifier is stored as part of the binding data. The binding identifier can be associated with the contact, including the contact's communication information. When an ongoing voice call with John Doe is detected, the binding identifier can be used to associate lazily bound media to the voice call with John Doe, and the media will be transferred to John Doe during or after the voice call using the contact's communication information. In some implementations, the binding identifier can be the telephone number of the contact, which is John Doe's telephone number in this example.

Figure 5:
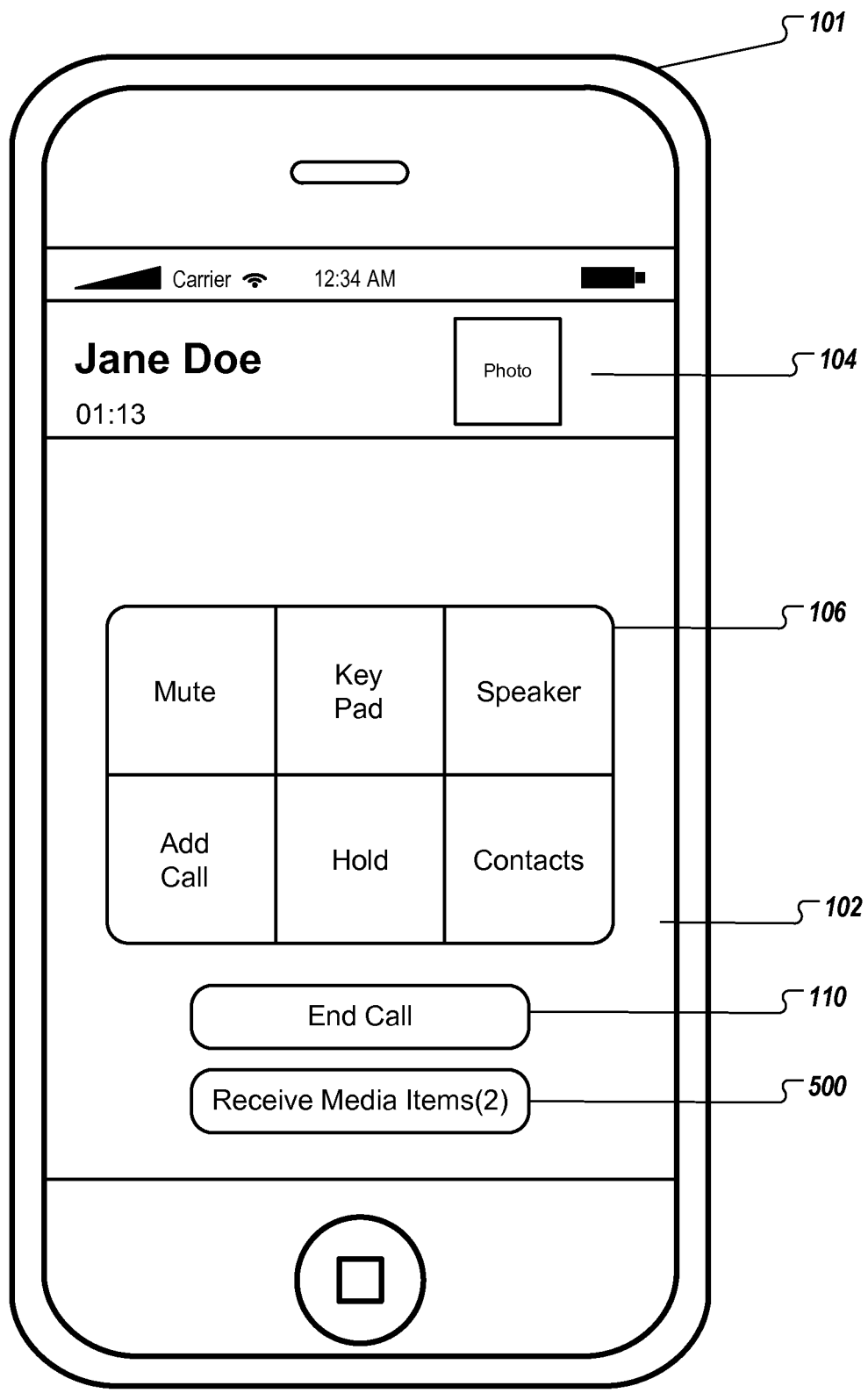
FIG. 5 illustrates an exemplary user interface of a telephony application for receiving media items during an ongoing voice call.

FIG. 5 illustrates an exemplary user interface of a telephony application for receiving media items during an ongoing voice call. In this example, mobile device 101 is operated by John Doe who is currently on a voice call with Jane Doe. The photos 302, 304 that were selected and sent by Jane Doe using active binding and MMS are received on the mobile device 101 as an attachment to a text message. A "receive media items" button 500 is displayed, providing John Doe with an option to accept the media items. In some implementations, the number of media items received can be displayed in the button or elsewhere on the user interface. In some implementations, an audio indicator can be provided when transfer of the media items to the mobile device 101 has successfully completed.

Figure 6:
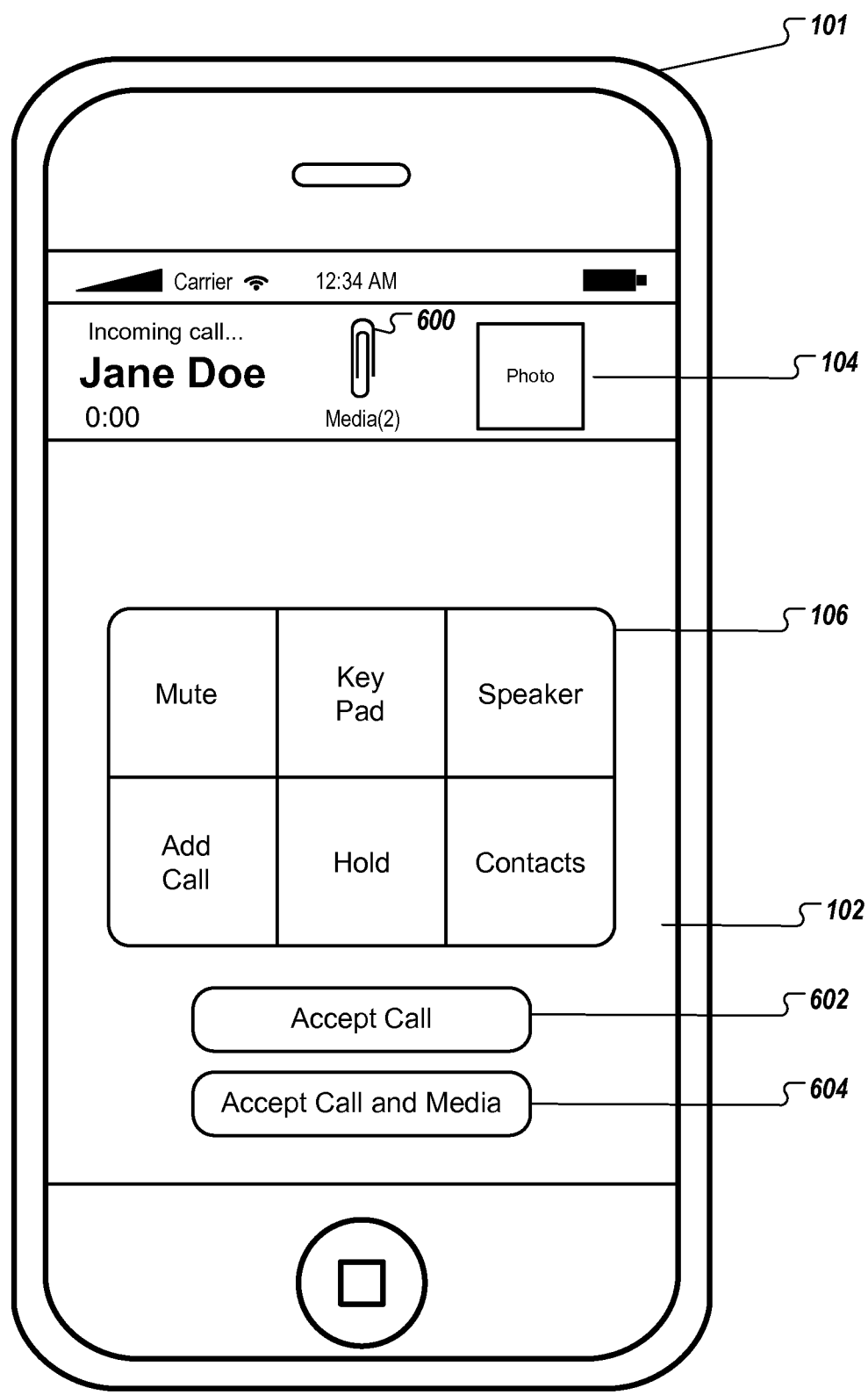
FIG. 6 illustrates an exemplary user interface of a telephony application for accepting or denying media items bound to an incoming call.

FIG. 6 illustrates an exemplary user interface of a telephony application for accepting or denying media items bound to an incoming call. In this example, mobile device 101 is operated by John Doe who has received an incoming call from Jane Doe. A visual indicator 600 is displayed in the call information region 104 to indicate that the voice call is bound to two media items. Other visual indicators also are possible. An "accept call" button 602 can be selected (e.g., touched) to accept the call. In addition, an "accept call and media" button 604 can be selected to accept the call and the media items. In some implementations, when John Doe selects button 604, the appropriate application is invoked on mobile device 101 to provide access to the media items. In this example, an image viewer or photo editing application can be automatically invoked when the button 604 is selected. In other implementations, the media items can be stored for future retrieval after the voice call has concluded. The preference for automatic invocation or storing for later invocation can be an option selectable by a user in a call settings menu or other suitable input mechanism.

Figure 7:
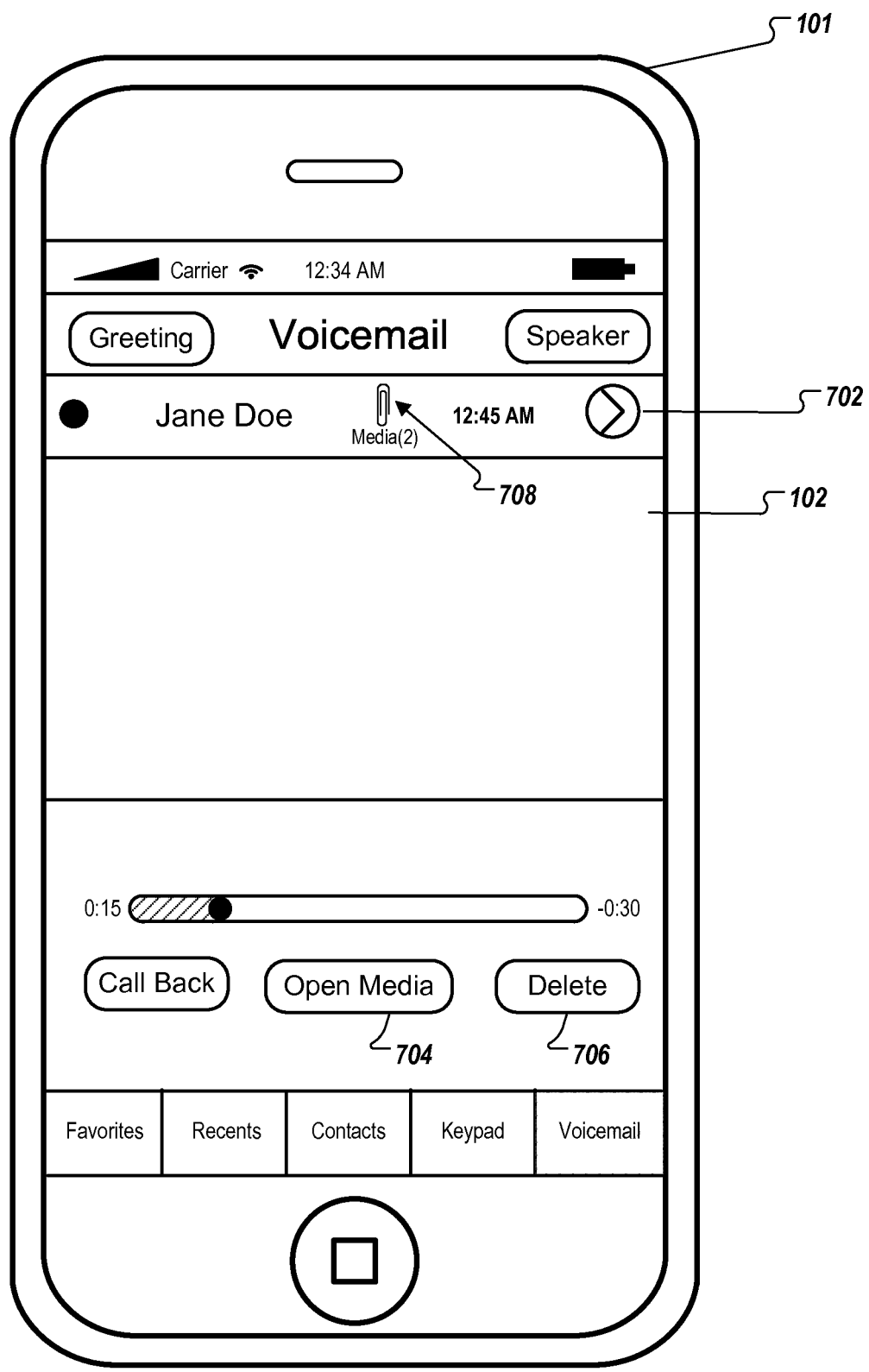
FIG. 7 illustrates an exemplary user interface for a visual voicemail box for storing voicemail with bound media.

FIG. 7 illustrates an exemplary user interface for a visual voicemail box for storing voicemail with bound media. In some scenarios, a caller may leave a voicemail in a mailbox of a called party. In such cases, media items can be attached to the voicemail. In the example shown, Jane Doe has left visual voicemail 702 in John Doe's mailbox for his mobile device 101. A user interface for visual voice mail can include a visual indictor 708 attached to the visual voicemail 702 to indicate that the voicemail has media items attached. An "open media item" button 704 can be used to open the media item directly. Alternatively, the voicemail 702 can be opened and the media items can be individually selected and invoked. The user can be provided an option to save the media items even if the voicemail is deleted. For example, when John Doe presses the "delete" button 706, a message pane can be presented with an option to save the media items.

Exemplary Processes for Binding Media with Voice Calls

Figure 8:
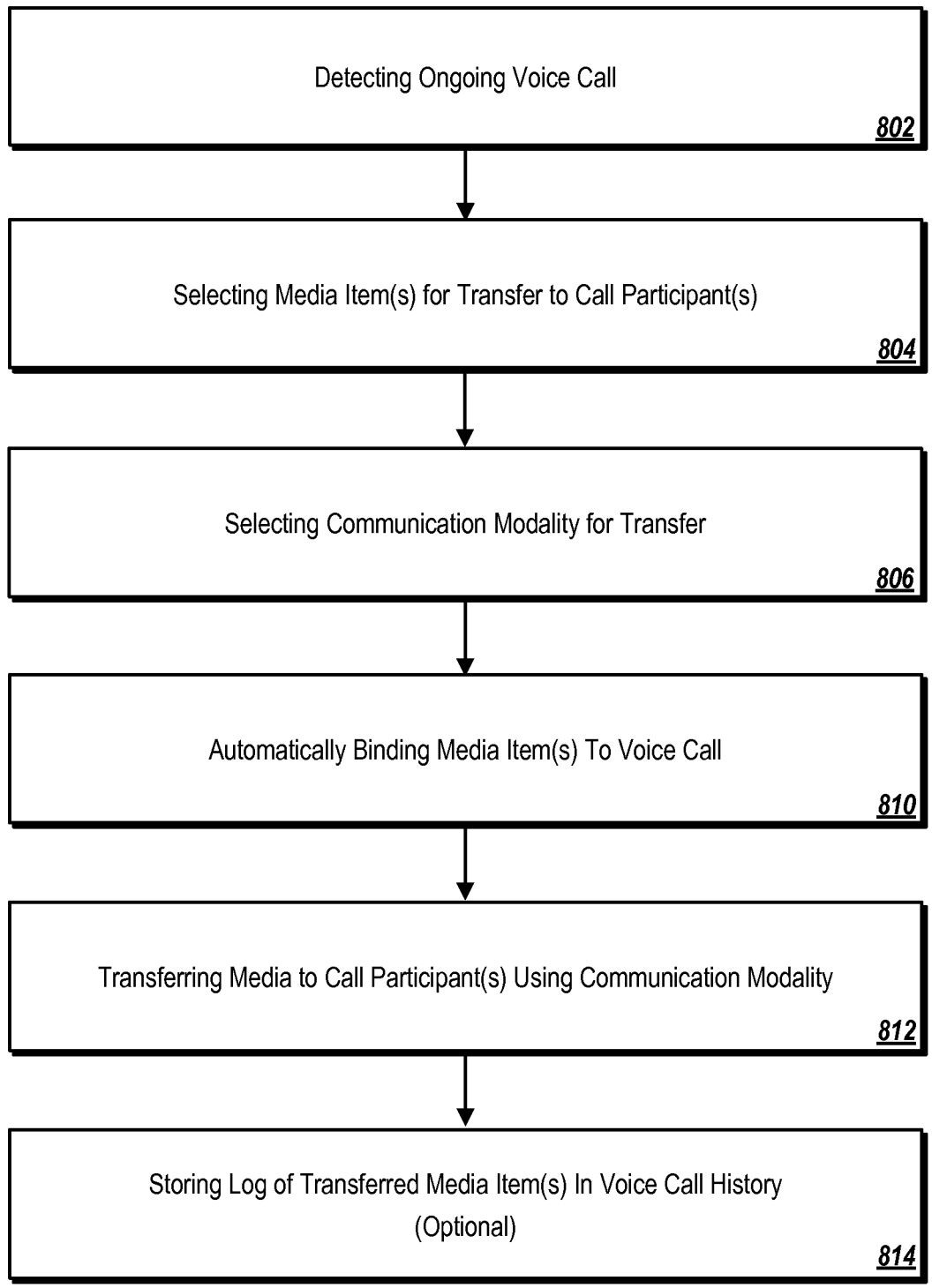
FIG. 8 is a flow diagram of an exemplary process implementing binding protocol.

FIG. 8 is a flow diagram of an exemplary process 800 for active binding. Process 800 can be implemented by the device architecture and operating environment shown in FIGS. 10 and 11, respectively.

In some implementations, process 800 can begin by detecting an ongoing voice call on a communication device (802). In some implementations, a communication service in a software operating system can detect when a voice call is ongoing from a radio board used for wireless communications.

Upon detection, a telephony application can generate a user interface for selecting one or more media items for transfer to a call participant (804). This selection can include the user interfaces described in reference to FIGS. 1-3.

In some implementations, a communication modality, such as email, Short Message Service (SMS) or MMS can be selected by a user from a user interface (806). The selection of media items can also be performed programmatically by an application or operating system based on default or user selected settings.

The selected media item(s) are bound to the voice call (810). In some implementations, the binding protocol for active binding automatically associates the media with a unique binding identifier representing the voice call and persistently stores the unique binding identifier in a database on the communication device and/or on a storage device of a network resource. Additional information related to the call can also be stored, as previously described in reference to FIG. 3A.

The actively bound media item(s) can be transferred to one or more call participants using the communication modality (812). The transfer can be during or after the voice call.

Optionally, a log of transferred media item(s) and the media(s) can be stored locally in the communication device or on a storage device operated by a network service (814). In some implementations, a reference (e.g., a URI) to the transferred media item(s) can be stored locally in the communication device, or by the network service, which can be used to download the media item(s) to the call participants during or after the voice call. The reference can include the unique binding identifier assigned to the voice call to access the media item(s).

An exemplary process for lazy binding can perform steps 804 and 806 prior to a voice call being established. In step 806, a binding identifier would be stored as part of the binding data. The binding identifier can be associated with a contact, including the contact's communication information. The binding identifier can be used to associate the lazily bound media to the voice call, and the media will be transferred to the call participant during or after the voice call using the contact's communication information.

Figure 9:
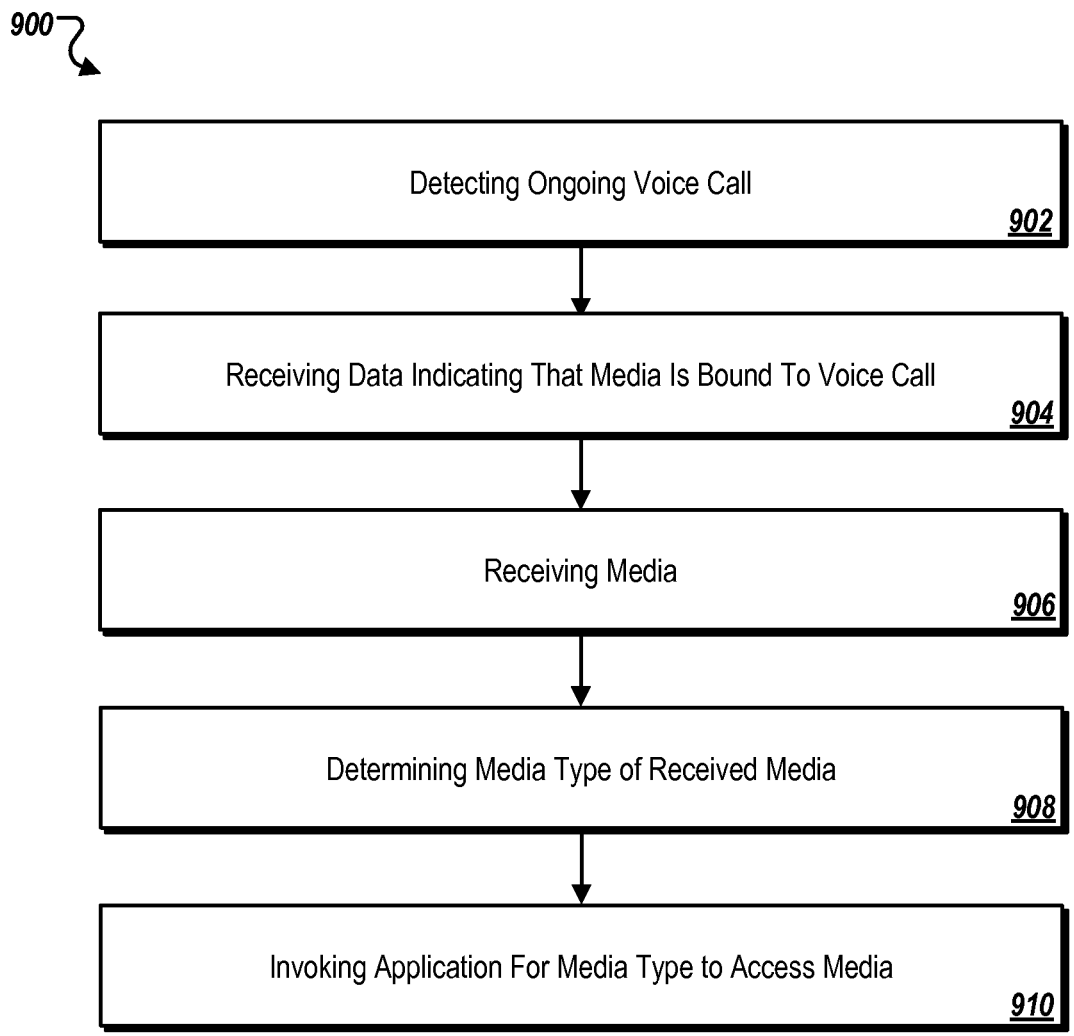
FIG. 9 is a flow diagram of an exemplary process for receiving media bound to a voice call using binding protocol.

FIG. 9 is a flow diagram of an exemplary process 900 for receiving media that has been bound to a voice call using active or lazy binding. Process 900 can be implemented by the device architecture and operating environment shown in FIGS. 10 and 11, respectively.

In some implementations, process 900 can begin by detecting an ongoing voice call (902). Data indicating that media is bound to the voice call is received (904). This data can be the binding indicator, as described in reference to FIG. 4. The data can be sent with the call using conventional call data protocols, such as General Packet Radio Service (GPRS), SMS or MMS.

One or more media items are received (906). The items can be received through any known communication modality, including as an attachment to email or text message. A media type is determined from the type of the media received (908). The media type can be determined by header information in packets (if packet based) or by filename extensions. Other methods are also possible. Once the media type is known, the appropriate application for the media type can be invoked to allow the call participant to access the media (910). In the example previously described, an image viewer can be invoked for displaying photos 302, 304.

Exemplary Mobile Device Architecture

Figure 10:
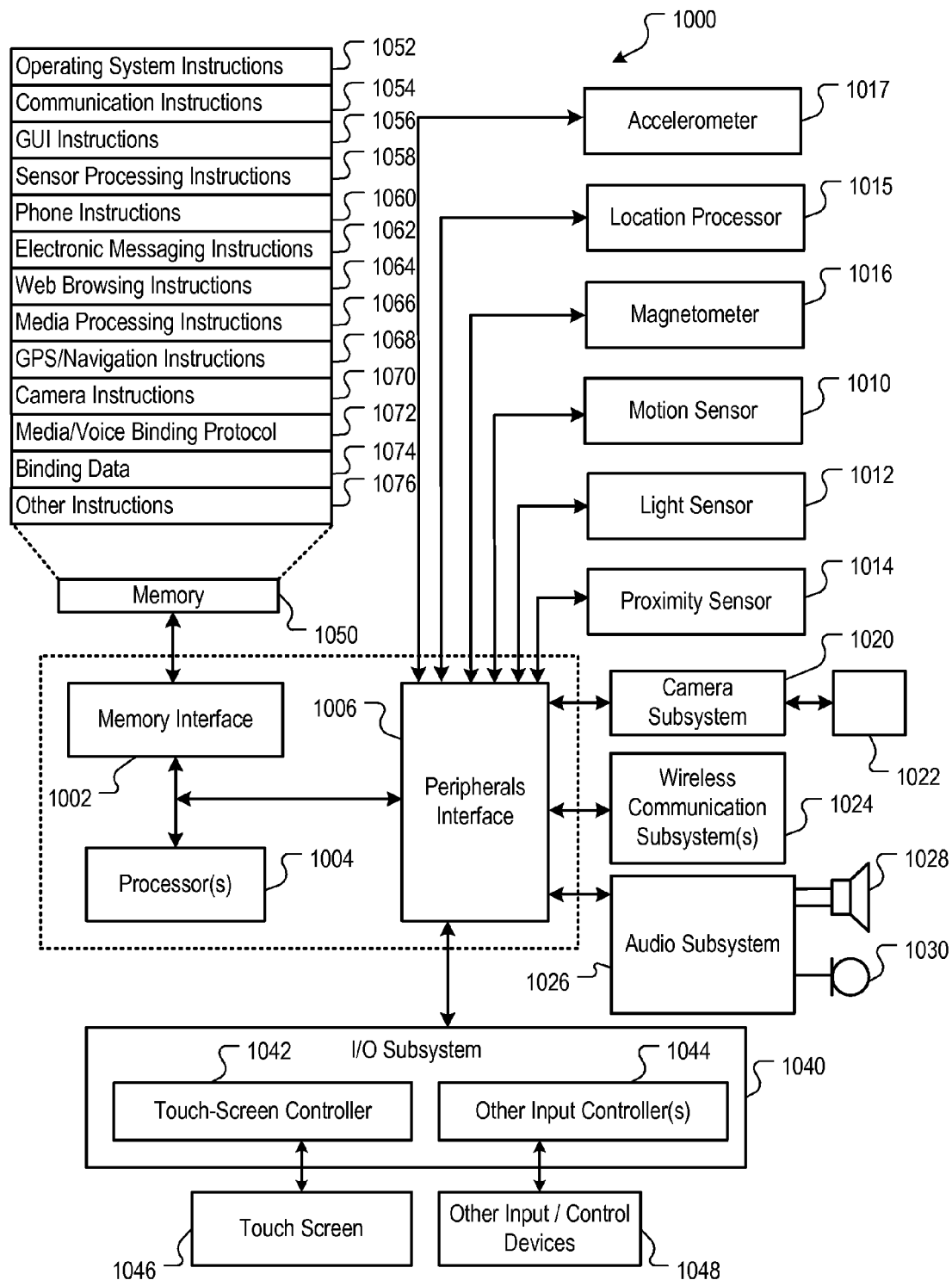
FIG. 10 is a block diagram of exemplary hardware architecture for implementing the features and processes described in reference to FIGS. 1-9.

FIG. 10 is a block diagram of exemplary hardware architecture for implementing the features and processes described in reference to FIGS. 1-9. The device can include memory interface 1002, one or more data processors, image processors and/or processors 1004, and peripherals interface 1006. Memory interface 1002, one or more processors 1004 and/or peripherals interface 1006 can be separate components or can be integrated in one or more integrated circuits. The various components in the device, for example, can be coupled by one or more communication buses or signal lines.

Sensors, devices, and subsystems can be coupled to peripherals interface 1006 to facilitate multiple functionalities. For example, motion sensor 1010, light sensor 1012, and proximity sensor 1014 can be coupled to peripherals interface 1006 to facilitate orientation, lighting, and proximity functions of the mobile device. Location processor 1015 (e.g., GPS receiver) can be connected to peripherals interface 1006 to provide geopositioning. Electronic magnetometer 1016 (e.g., an integrated circuit chip) can also be connected to peripherals interface 1006 to provide data that can be used to determine the direction of magnetic North. Thus, electronic magnetometer 1016 can be used as an electronic compass. Accelerometer 1017 can also be connected to peripherals interface 1006 to provide data that can be used to determine change of speed and direction of movement of the mobile device.

Camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1024, which can include radio frequency receivers and transmitters and/or optical (e.g., infrared) receivers and transmitters. The specific design and implementation of the communication subsystem 1024 can depend on the communication network (s) over which a mobile device is intended to operate. For example, a mobile device can include communication subsystems 1024 designed to operate over a GSM network, a GPRS network, an EDGE network, a WiFi or WiMax network, and a Bluetooth network. In particular, the wireless communication subsystems 1024 can include hosting protocols such that the mobile device can be configured as a base station for other wireless devices.

Audio subsystem 1026 can be coupled to a speaker 1028 and a microphone 1030 to facilitate voice-enabled functions, such as voice recognition, voice replication, digital recording, and telephony functions.

I/O subsystem 1040 can include touch screen controller 1042 and/or other input controller(s) 1044. Touch-screen controller 1042 can be coupled to a touch screen 1046 or pad. Touch screen 1046 and touch screen controller 1042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 1046.

Other input controller(s) 1044 can be coupled to other input/control devices 1048, such as one or more buttons, rocker switches, thumb-wheel, infrared port, USB port, and/or a pointer device such as a stylus. The one or more buttons (not shown) can include an up/down button for volume control of speaker 1028 and/or microphone 1030.

In one implementation, a pressing of the button for a first duration may disengage a lock of the touch screen 1046; and a pressing of the button for a second duration that is longer than the first duration may turn power to the device on or off. The user may be able to customize a functionality of one or more of the buttons. The touch screen 1046 can, for example, also be used to implement virtual or soft buttons and/or a keyboard.

In some implementations, the device can present recorded audio and/or video files, such as MP3, AAC, and MPEG files. In some implementations, the device can include the functionality of an MP3 player, such as an iPod™. The device may, therefore, include a pin connector that is compatible with the iPod. Other input/output and control devices can be used.

Memory interface 1002 can be coupled to memory 1050. Memory 1050 can include high-speed random access memory and/or non-volatile memory, such as one or more magnetic disk storage devices, one or more optical storage devices, and/or flash memory (e.g., NAND, NOR). Memory 1050 can store operating system 1052, such as Darwin, RTXC, LINUX, UNIX, OS X, WINDOWS, or an embedded operating system such as VxWorks. Operating system 1052 may include instructions for handling basic system services and for performing hardware dependent tasks. In some implementations, operating system 1052 can include a kernel (e.g., UNIX kernel).

Memory 1050 may also store communication instructions 1054 to facilitate communicating with one or more additional devices, one or more computers and/or one or more servers. Memory 1050 may include graphical user interface instructions 1056 to facilitate graphic user interface processing, such as the user interfaces illustrated in FIGS. 1-4; sensor processing instructions 1058 to facilitate sensor-related processing and functions; phone instructions 1060 to facilitate phone-related processes and functions; electronic messaging instructions 1062 to facilitate electronic-messaging related processes and functions, such as SMS and MMS; web browsing instructions 1064 to facilitate web browsing-related processes and functions; media processing instructions 1066 to facilitate media processing-related processes and functions; GPS/Navigation instructions 1068 to facilitate GPS and navigation-related processes and instructions; and camera instructions 1070 to facilitate camera-related processes and functions. The memory 1050 may also store other software instructions (not shown), such as security instructions, web video instructions to facilitate web video-related processes and functions, and/or web shopping instructions to facilitate web shopping-related processes and functions.

Memory 1050 can include instructions for a media/voice active and lazy binding protocols 1072 and binding data 1074, as well as other instructions 1076 for implementing the feature, user interfaces, and processes described in reference to FIGS. 1-6.

Each of the above identified instructions and applications can correspond to a set of instructions for performing one or more functions described above. These instructions need not be implemented as separate software programs, procedures, or modules. Memory 1050 can include additional instructions or fewer instructions. Furthermore, various functions of the mobile device may be implemented in hardware and/or in software, including in one or more signal processing and/or application specific integrated circuits.

Exemplary Operating Environment

Figure 11:
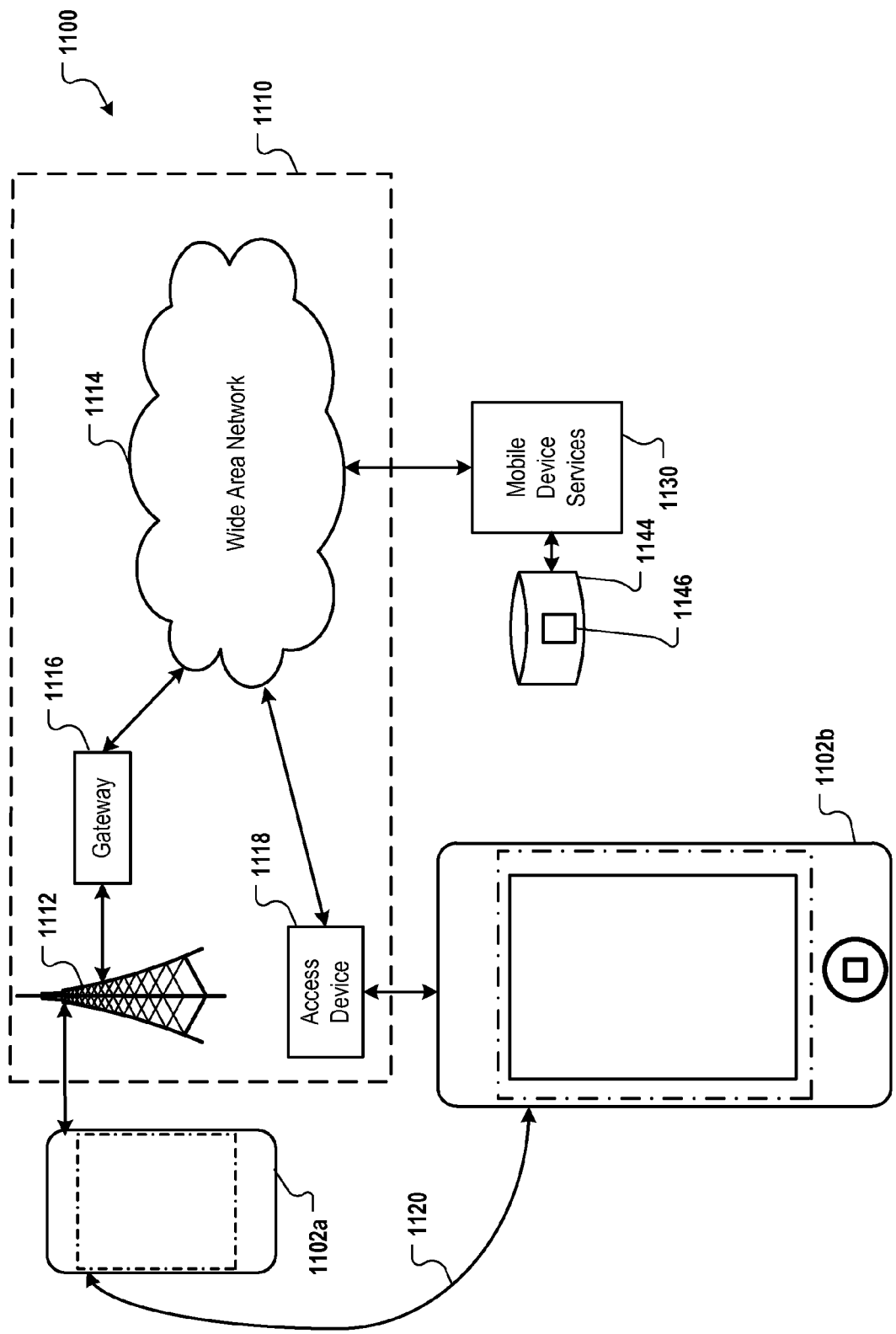
FIG. 11 is a block diagram of exemplary network operating environment for the device of FIG. 10.

FIG. 11 is a block diagram of an exemplary network operating environment for the device of FIG. 10. In this example, devices 1102a and 1102b can, for example, communicate over one or more wired and/or wireless networks 1110 in data communication. For example, a wireless network 1112, e.g., a cellular network, can communicate with a wide area network (WAN) 1114, such as the Internet, by use of a gateway 1116. Likewise, an access device 1118, such as an 802.11g wireless access device, can provide communication access to the wide area network 1114. Although this example illustrates an operating environment for mobile devices, the operating environment can also be applied to a device that is wired to a network (e.g., a desktop computer).

In some implementations, both voice and data communications can be established over wireless network 1112 and the access device 1118. For example, mobile device 1102a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1112, gateway 1116, and wide area network 1114 (e.g., using Transmission Control Protocol/Internet Protocol (TCP/IP) or User Datagram Protocol (UDP)). Likewise, in some implementations, the mobile device 1102b can place and receive phone calls, send and receive e-mail and text messages, and retrieve electronic documents over the access device 1118 and the wide area network 1114. In some implementations, device 1102a or 1102b can be physically connected to the access device 1118 using one or more cables and the access device 1118 can be a personal computer. In this configuration, device 1102a or 1102b can be referred to as a "tethered" device.

Devices 1102a and 1102b can also establish communications by other means. For example, wireless device 1102a can communicate with other wireless devices, e.g., other devices 1102a or 1102b, cell phones, etc., over the wireless network 1112. Likewise, devices 1102a and 1102b can establish peer-to-peer communications 1120, e.g., a personal area network, by use of one or more communication subsystems, such as the Bluetooth™ communication devices. Other communication protocols and topologies can also be implemented.

Device 1102a or 1102b can communicate with a variety of network services over the one or more wired and/or wireless networks. In some implementations, network services can include mobile device services 1130. Mobile device services 1130 can provide a variety of services for device 1102a or 1102b, including but not limited to mail services, text messaging, chat sessions, videoconferencing, Internet services, location based services (e.g., map services), sync services, remote storage 1144, downloading services, etc. Remote storage 1144 can be used to store binding data and/or media 1146, which can be made available to other users.

Device 1102a or 1102b can also access other data and content over the one or more wired and/or wireless networks. For example, content publishers, such as news sites, Rally Simple Syndication (RSS) feeds, web sites, blogs, social networking sites, developer networks, etc., can be accessed by device 1102a or 1102b. Such access can be provided by invocation of a web browsing function or application (e.g., a browser) in response to a user touching, for example, a Web object.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. Yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method performed by one or more hardware processors of a mobile device, comprising:
    detecting an ongoing voice call;
    presenting, in response to the detection of the ongoing voice call, a user interface to enable selection of media items to transfer to a participant of the ongoing voice call;
    receiving, via the user interface, a selection of one or more media items;
    automatically binding the one or more media items to the voice call in response to the received selection;
    receiving a request to transfer the one or more media items; and
    transferring the one or more media items to the call participant based on the binding, wherein the one or more media items are transferred over a first secure data communications channel independent of a second communications channel used to conduct the voice call.

2. The method of claim 1, wherein the act of receiving a selection of one or more media items comprises:
    receiving a first input selecting a media type; and
    receiving a second input selecting at least one of the one or more media items of the media type.

3. The method of claim 1, wherein the act of receiving a request to transfer the one or more media items comprises receiving input selecting a communication modality and wherein the act of transferring the one or more media items comprises using the selected communication modality to transfer the one or more media items.

4. The method of claim 1, wherein the act of automatically binding the one or more media items to the voice call comprises:
    automatically determining a telephone number of the call participant from a call record or contact information; and
    automatically using the telephone number to configure a multimedia messaging service to transfer the one or more media items to the call participant.

5. The method of claim 1, wherein the act of automatically binding the one or more media items to the voice call comprises:
    automatically determining an email address of the call participant from a contact information;
    automatically using the email address to address an email to the call participant; and
    automatically including the one or more media items as an attachment to the email.

6. The method of claim 1, further comprising:
    storing binding data on the mobile device or on a storage device of a network resource.

7. The method of claim 1, further comprising:
    determining that a voice or video mail message is being created for the call participant; and
    automatically attaching the one or more media items to the voice or video mail message based on the binding.

8. The method of claim 1, further comprising:
    creating the one or more media items during the voice call.

9. A computer-implemented method performed by one or more hardware processors of a mobile device, comprising:
    receiving input associating media with a first contact;
    storing binding data that links the media with communication information for establishing communication with the first contact;
    detecting, after receiving the input, initiation of a voice call associated with the communication information; and
    transferring the media to a call participant based, at least in part, on the stored binding data.

10. The method of claim 9, wherein the act of storing binding data comprises storing a binding identifier comprising a telephone number of the first contact.

11. The method of claim 9, where the input is received from a user of the mobile device.

12. A computer-implemented method performed by one or more hardware processors of a mobile device, comprising:
- receiving an incoming voice call;
- determining that the incoming voice call includes one or more bound media items;
- displaying a user interface to indicate that the incoming voice call includes the one or more bound media items; and
- storing the one or more media items.

13. The method of claim 12, further comprising:
- automatically invoking an application on the mobile device for providing access to the one or more media items, where the application is selected based on a type of the one or more media items.

14. A non-transitory computer-readable storage medium having instructions stored thereon, which, when executed by one or more processors, cause the one or more processors to:
- detect an ongoing voice call;
- present, in response to the detection of the ongoing voice call, a user interface to enable selection of media items to transfer to a participant of the ongoing voice call;
- receive, via the user interface, a selection of one or more media items;
- automatically bind the one or more media items to the voice call in response to the received selection;
- receive a request to transfer the one or more media items; and
- transfer the one or more media items to the call participant based on the binding, wherein the one or more media items are transferred over a first secure data communications channel independent of a second communications channel used to conduct the voice call.

15. The computer-readable storage medium of claim 14, wherein the instructions to cause the one or more processors to receive a selection of one or more media items comprise instructions to cause the one or more processors to:
- receive a first input selecting a media type; and
- receive a second input selecting at least one of the one or more media items of the media type.

16. The computer-readable storage medium of claim 14, wherein the instructions to cause the one or more processors to receive a request to transfer the one or more media items comprise instructions to cause the one or more processors to receive input selecting a communication modality and wherein the instructions to cause the one or more processors to transfer the one or more media items comprise instructions to cause the one or more processors to use the selected communication modality to transfer the one or more media items.

17. The computer-readable storage medium of claim 14, wherein the instructions to cause the one or more processors to automatically bind the one or more media items to the voice call comprise instructions to cause the one or more processors to:
- automatically determine a telephone number of the call participant from a call record or contact information; and
- automatically use the telephone number to configure a multimedia messaging service to transfer the one or more media items to the call participant.

18. The computer-readable storage medium of claim 14, wherein the instructions to cause the one or more processors to automatically bind the one or more media items to the voice call comprise instructions to cause the one or more processors to:
- automatically determine an email address of the call participant from a contact information;
- automatically use the email address to address an email to the call participant; and
- automatically include the one or more media items as an attachment to the email.

19. A non-transitory computer-readable storage medium having instructions stored thereon, which, when executed by one or more processors, cause the one or more processors to:
- receive input associating media with a first contact;
- store binding data that links the media with communication information for establishing communication with the first contact;
- detect, after receiving the input, initiation of a voice call associated with the communication information; and
- transfer the media to a call participant based, at least in part, on the stored binding data.

20. The computer-readable storage medium of claim 19, wherein the instructions to cause the one or more processors to store binding data comprise instructions to cause the one or more processors to store a binding identifier comprising a telephone number of the first contact.

21. A non-transitory computer-readable storage medium having instructions stored thereon, which, when executed by one or more processors, cause the one or more processors to:
- receive an incoming voice call;
- determine that the incoming voice call includes one or more bound media items;
- display a user interface to indicate that the incoming voice call includes the one or more bound media items; and
- store the one or more media items.

* * * * *